(12) United States Patent
Sumser et al.

(10) Patent No.: US 10,724,434 B2
(45) Date of Patent: Jul. 28, 2020

(54) TURBINE FOR AN EXHAUST GAS TURBOCHARGER OF AN INTERNAL COMBUSTION ENGINE

(71) Applicant: Daimler AG, Stuttgart (DE)

(72) Inventors: Siegfried Sumser, Stuttgart (DE); Markus Mueller, Waiblingen (DE); Paul Loeffler, Stuttgart (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 16/338,264

(22) PCT Filed: Aug. 25, 2017

(86) PCT No.: PCT/EP2017/001014
§ 371 (c)(1),
(2) Date: Mar. 29, 2019

(87) PCT Pub. No.: WO2018/059726
PCT Pub. Date: Apr. 5, 2018

(65) Prior Publication Data
US 2020/0032705 A1    Jan. 30, 2020

(30) Foreign Application Priority Data
Oct. 1, 2016    (DE) .................. 10 2016 011 838

(51) Int. Cl.
*F02C 6/12*            (2006.01)
*F01D 9/02*            (2006.01)
(Continued)

(52) U.S. Cl.
CPC .............. *F02C 6/12* (2013.01); *F01D 9/026* (2013.01); *F01D 17/165* (2013.01);
(Continued)

(58) Field of Classification Search
CPC ...... F01D 17/165; F01D 9/026; F01D 17/167; F02B 37/025; F02B 37/22; F02C 6/12; F05D 2220/40; Y02T 10/144
See application file for complete search history.

(56) References Cited

U.S. PATENT DOCUMENTS 4,177,005 A * 12/1979 Bozung .................. F01D 9/026
                                                              415/128
5,267,829 A    12/1993 Schmidt et al.
(Continued)

FOREIGN PATENT DOCUMENTS

CN        102182546 A      9/2011
DE        199 18 232 A1    11/2000
(Continued)

OTHER PUBLICATIONS

PCT/EP2017/001014, International Search Report dated Nov. 14, 2017 (Three (3) pages).

*Primary Examiner* — Jesse S Bogue
(74) *Attorney, Agent, or Firm* — Crowell & Moring LLP

(57) ABSTRACT

A turbine has a turbine housing with a receiving region, a turbine wheel which is disposed in the receiving region, a duct formed by the turbine housing, through which exhaust gas of an internal combustion engine can flow and which opens into the receiving region, and a tongue slide which has a tongue which is assigned to the duct and which can be displaced relative to the turbine housing about the rotational axis such that a flow cross section of the duct can be set. The exhaust gas which flows through the duct can be guided via the flow cross section into the receiving region and can be fed to the turbine wheel. The turbine is configured as a half-axial flow turbine in which a respective flow direction runs obliquely with respect to the axial direction and obliquely with respect to the radial direction of the turbine wheel.

6 Claims, 5 Drawing Sheets

(51) Int. Cl.
    *F01D 17/16*     (2006.01)
    *F02B 37/02*     (2006.01)
    *F02B 37/22*     (2006.01)

(52) U.S. Cl.
    CPC .......... *F01D 17/167* (2013.01); *F02B 37/025* (2013.01); *F02B 37/22* (2013.01); *F05D 2220/40* (2013.01)

(56) References Cited

U.S. PATENT DOCUMENTS

| | | | |
|---|---|---|---|
| 6,260,358 | B1 | 7/2001 | Daudel et al. |
| 6,269,642 | B1 * | 8/2001 | Arnold ................. F01D 17/165 415/163 |
| 7,047,739 | B2 * | 5/2006 | Fledersbacher ......... F01D 9/026 415/157 |
| 9,291,092 | B2 * | 3/2016 | Sumser ................. F01D 17/105 |
| 9,447,723 | B2 * | 9/2016 | Hirth .................... F02B 37/025 |
| 10,408,228 | B2 * | 9/2019 | Grabowska ........... F04D 29/563 |
| 2014/0050568 | A1 * | 2/2014 | Brinkert ................... F01D 7/00 415/148 |
| 2016/0312651 | A1 * | 10/2016 | Boening ................ F01D 5/048 |

FOREIGN PATENT DOCUMENTS

| | | |
|---|---|---|
| DE | 10 2008 039 085 A1 | 2/2010 |
| DE | 10 2011 109 643 A1 | 2/2013 |
| DE | 10 2012 016 984 A1 | 3/2014 |
| WO | WO 2008/101105 A2 | 8/2008 |
| WO | WO 2013/116136 A1 | 8/2013 |

\* cited by examiner

TURBINE FOR AN EXHAUST GAS TURBOCHARGER OF AN INTERNAL COMBUSTION ENGINE

BACKGROUND AND SUMMARY OF THE INVENTION

The invention relates to a turbine for an exhaust gas turbocharger of an internal combustion engine.

A turbine of this kind for an exhaust gas turbocharger of an internal combustion engine is already known, for example, from DE 10 2008 039 085 A1.

The turbine comprises a turbine housing, which has a receiving region. The turbine further comprises a turbine wheel which is at least partly, in particular at least predominately or completely, arranged in the receiving region and is rotatable relative to the turbine housing about an axis of rotation.

The turbine also has at least one channel which is formed by the turbine housing and by means of which the exhaust gas flowing through the channel can be or—during an operation of the turbine—is guided into the receiving region and to the turbine wheel. The exhaust gas flowing through the channel can flow out of and into the receiving region such that the exhaust gas flowing into the receiving region can flow against and thus drive the turbine wheel.

The turbine further comprises a tongue slide which has at least one tongue that is associated with the channel and can slide relative to the turbine housing about the axis of rotation. A flow cross section of the channel associated with the tongue can be adjusted by means of the tongue. The exhaust gas flowing through the channel can be conveyed into the receiving region via the flow cross section and supplied to the turbine wheel. In other words, the channel leads into the receiving region via the associated flow cross section such that the exhaust gas flowing out of the channel and into the receiving channel flows out of the channel outlet region and into the receiving region via the flow cross section.

In addition, DE 10 2012 016 984 A1 also discloses a turbine for an exhaust gas turbocharger of an internal combustion engine having a tongue slide of this kind. Furthermore, DE 199 18 232 A1 discloses a multi-cylinder internal combustion engine.

The object of the present invention is that of further developing a turbine of the kind mentioned at the outset such that a particularly efficient operation can be realized.

In order to further develop a turbine such that a particularly efficient operation, and thus an operation that has a favorable degree of effectiveness, can be achieved, according to the invention the turbine is a half-axial turbine in which a flow direction, in which the exhaust gas flows from the channel through the flow cross section into the receiving region and thus to the turbine wheel during an operation of the turbine, extends obliquely to the axial direction and obliquely to the radial direction of the turbine wheel. In particular, the flow direction extends obliquely to the radial direction and obliquely to the axial direction of the turbine wheel for example in a plane spanned by the axial direction and by the radial direction of the turbine wheel, such that the exhaust gas is not supplied to the turbine wheel, in particular blades of a turbine wheel, for instance strictly in the radial direction or strictly in the axial direction, but rather the exhaust gas from the channel is supplied to the turbine wheel half-axially, i.e., obliquely to the axial direction and obliquely to the radial direction.

The invention is based in particular on the following knowledge: the continuing tightening of emission thresholds, in particular with respect to NOx and soot emissions, has had a significant influence on charging systems. Such a charging system is used in an internal combustion engine, the charging system being used to supply the internal combustion engine, in particular at least one combustion chamber, designed for example as a cylinder, of the internal combustion engine, with compressed air. Such a charging system therefore comprises at least one exhaust gas turbocharger which has a turbine that can be driven by exhaust gas from the internal combustion engine, and a compressor for compressing the air to be supplied to the internal combustion engine. The compressor can be driven by the turbine. Since the turbine can be driven by exhaust gas, the energy contained in the exhaust gas can be used to compress the air. Owing to increasing requirements with respect to the provision of charging pressure as a result of high specific power requirements and high EGR rates (EGR—exhaust gas recirculation) above the medium load range through to full loading, it is cogent to geometrically scale down the turbines of the charging systems further and further. The required turbine powers are thus also realized by increasing the build-up ability or by reducing the absorption capacity of the turbines in conjunction with the particular internal combustion engine.

Furthermore, particle or soot filters are commonly used, by means of which particles, in particular soot particles, can be filtered out of the particular exhaust gas of the internal combustion engine. The inlet pressure level of the turbines is therefore driven further upwards by the counter-pressure of the soot filter, as a result of which the turbines again have to be designed to have smaller dimensions and thus lower degrees of effectiveness in order to be able to satisfy power requirements on the compressor side for the air-exhaust gas supply. In this case, dual-flow, asymmetric turbines are used for example as core components of exhaust gas recirculation systems. A larger problem with respect to the EGR capability in connection with the required combustion air to be supplied of the internal combustion engine consists in particular in the low to medium engine operating range in the case of a high load. In the conventional design boundary conditions, which are also defined from the nominal point of the internal combustion engine from the charge exchange side or consumption side, the lower engine speed range cannot be optimally operated in an asymmetric, dual-flow, fixed geometry turbine. A fixed geometry turbine is understood to mean a turbine having a fixed turbine geometry, i.e., without a variable turbine geometry.

In order to be able to optimally adjust the relationship between the AGR rates and the required air-fuel ratios in a larger operating range, a dual-flow type of turbine of which the pulse-charging capacity in a cylinder group is more pronounced would be useful. Turbines which are specifically designed for pulse-charging have noticeably larger flow cross sections in order to exploit the larger energy fluctuations or pressure pulses that can be used. These high pressure pules of the internal combustion engine exist on the turbine of the exhaust gas turbocharger when the throttling and friction losses that usually occur at outlet valves of the internal combustion engine and in the manifold region are noticeably reduced going into the turbine by a corresponding geometric design. The reduction in the throttling and friction losses upstream of the turbines assists the achievement of the aim of the desired extreme pulse-charging, as a result of which an increase in the average overall degree of effectiveness of the exhaust gas energy exploitation can be achieved in spite of a large temporal fluctuation in the degree of effectiveness of the turbine.

The key to realizing weighting of the pulse-charging is provided by the segment turbine, which preferably ought to be provided with a variability of essential flow cross sections in order to also be able to persist in the upper engine speed range. In order to also advantageously realize future development trends, which are characterized by the further use of the present potential of improved exhaust gas after-treatment, in many cases the reduction in the degree of asymmetry of the turbines toward asymmetric turbine behavior is not implausible in order to be able to further influence consumption facilitation of internal combustion engines.

In developments of variable turbines, the simple radial turbine has been the focus for the turbocharger application for many decades, since the radial annular nozzle offers very favorable conditions for a relatively simple design of inlet variabilities compared with the complex variabilities of axial turbines. A simple radial turbine is understood to mean that exhaust gas is supplied to the turbine wheel strictly in the radial direction, in particular based on a plane spanned by the axial direction and the radial direction of the turbine wheel. Recently, there has been an increase in half-axial turbines which, however, are usually fitted without an inlet variability upstream of the turbine wheel. Since the deflection in the spatial flow in the wheel channels of half-axial turbines is significantly reduced, there is clear potential with respect to the degree of effectiveness of the half-axial turbines, which provides additional development incentives compared with the extensively developed radial turbines.

According to the invention, a half-axial turbine is combined with the tongue slide, which is designed or functions as a variability, the tongue slide being arranged at least in part upstream of the turbine wheel. The tongue slide is a variability which is arranged at least in part upstream of the turbine wheel since, by means of the tongue slide, the flow cross section, which is arranged upstream of the turbine wheel with respect to the flow direction of the exhaust gas through the turbine, of the channel, which is designed for example as a segment, can be adjusted, that is to say varied or altered. In order to vary or alter the flow cross section, the tongue is rotated or slid relative to the turbine axis about the axis of rotation. As a result, the turbine can be advantageously adapted to different operating points of the internal combustion engine such that a particularly advantageous operation, and in particular an operation that has a favorable degree of effectiveness and is efficient, can be shown.

The turbine according to the invention therefore constitutes a further development of a tongue-slide turbine, which can increase the series relevance in particular in respect of MDEG engines. The tongue slide is a thermally robust option, which is favorable in terms of installation space and cost, for varying the channel flow cross section arranged upstream of the turbine wheel. The channel extends for example in the circumferential direction of the turbine wheel over the circumference thereof substantially in the shape of a spiral, and therefore the channel is for example a turbine spiral or a spiral segment.

The half-axial turbine is a compromise between the simple radial turbine and the simple axial turbine. Furthermore, the half-axial turbine is suitable for being adapted, in particular when the blades of the turbine wheel are strictly radial, to desired tip-speed ratio ranges without mechanical reductions having to be accepted, meaning that advantages with respect to the degree of effectiveness can be achieved compared with simple radial turbines and simple axial turbines. The tongue slide is in this case a simple turbine variability which can be implemented in a manner that is favorable in terms of installation space and cost and exhibits a high degree of thermal robustness.

It has proven to be particularly advantageous for the tongue to have at least one trailing edge by means of which the exhaust gas flows off the tongue toward the receiving region when the turbine is operated. The trailing edge extends at least in part along a theoretical surface that extends conically in the axial direction of the turbine wheel.

In a further embodiment of the invention, the turbine wheel has rotor blades having respective leading edges by means of which the exhaust gas flows against the turbine wheel when the turbine is operated, the respective leading edges extending at least in part along a theoretical surface that extends conically in the axial direction of the turbine wheel. This extension of the trailing edge or leading edge allows a particularly efficient operation. Therefore, whereas for example tongue trailing edges of the turbine housing and the trailing edge of the tongue in the case of simple radial turbines predominately lie on a cylindrical surface, the trailing edges of the tongue and also the leading edges of the rotor blades in the case of the half-axial turbine are at least predominately oriented on conical surfaces, and, in the meridian view, have an angle with respect to the axis of rotation that differs significantly from 0 and is in a range of from 20° inclusive to 60° inclusive.

The use of a half-axial turbine allows a degree of freedom with respect to the design of the blade inlet angle compared with the simple radial turbine. The blade inlet angle is in particular understood to mean the angle at which the exhaust gas flows against the particular rotor blade of the turbine wheel when the turbine is operated. In the case of the simple radial turbine, a blade inlet angle of at least substantially 90° with respect to the circumferential direction is usually required on grounds of stability. With respect to the combination of the half-axial turbine, or turbine wheel of the half-axial turbine, with the variability, which acts as an inlet variability and is designed as a tongue slide, there are a wide range of favorable possibilities for adapting the optimum degree of effectiveness to the tip-speed ratio range of from approximately 0.5 up to the value of 0.8 for a very advantageous operation of the internal combustion engine.

In a further embodiment of the invention, the tongue is arranged in the axial direction of the turbine between cover rings of the tongue slide, is connected to the cover rings and is rotatably mounted on the turbine housing by means of the cover rings. The cover rings form for example respective, at least substantially cylindrical running surfaces, which the cover rings are for example at least indirectly rotatably mounted on the turbine housing.

A further embodiment is characterized in that at least one of the cover rings is sealed off from the turbine housing by means of at least one sealing element. Preferably, both rings are sealed off from the turbine housing by means of respective sealing elements. The relevant sealing element is arranged for example on the above-mentioned, at least substantially cylindrical running surface. By sealing the relevant sealing ring off from the turbine housing, leakage and flow losses can be kept particularly low, and therefore a particularly efficient operation of the turbine can be shown.

It has also proven to be particularly advantageous for the tongue to be coupled to an actuator by one of the respective cover rings, by means of which actuator the tongue is rotatable or slidable relative to the turbine housing about the axis of rotation. As a result, the installation space requirements, the number of parts and the weight of the turbine can be kept particularly low, and therefore a particularly efficient and thus energy-saving operation can be shown.

In order to realize a particularly efficient operation, in a further embodiment, at least one contour piece is provided that is separate from the turbine housing and separate from the tongue slide and is held at least indirectly on the turbine housing, and by means of which at least part of the turbine wheel is covered outwardly in the radial direction, and in the axial direction. Since the contour piece is separate from the turbine housing, separate from the turbine wheel and separate from the tongue slide, a gap can be set as needed between the contour piece and the turbine wheel by means of the contour piece. On account of the precise and needs-based setting of the gap, the gap can be kept particularly small, and therefore flow and leakage losses can be kept particularly low.

In this case, it has proven to be particularly advantageous for one of the cover rings to be at least partly covered by the contour piece inwardly in the direction of the turbine wheel. As a result, undesired flows and thus flow losses can be kept particularly low, and therefore a particularly efficient operation can be shown.

A further embodiment is characterized in that the tongue slide is rotatably mounted on the contour piece by means of one of the cover rings. As a result, a particularly advantageous and therefore efficient operation of the turbine can be realized.

Further advantages, features and details of the invention can be found in the following description of a preferred embodiment and with reference to the drawings. The features and combinations of features stated above in the description as well as the features and combinations of features stated below in the description of the figures and/or shown in the figures alone can be used not only in the combination specified in each case, but also in other combinations or in isolation without departing from the scope of the invention.

DETAILED DESCRIPTION OF THE DRAWINGS

Identical or functionally identical elements are provided with the same reference signs in the figures.

Figure 1:
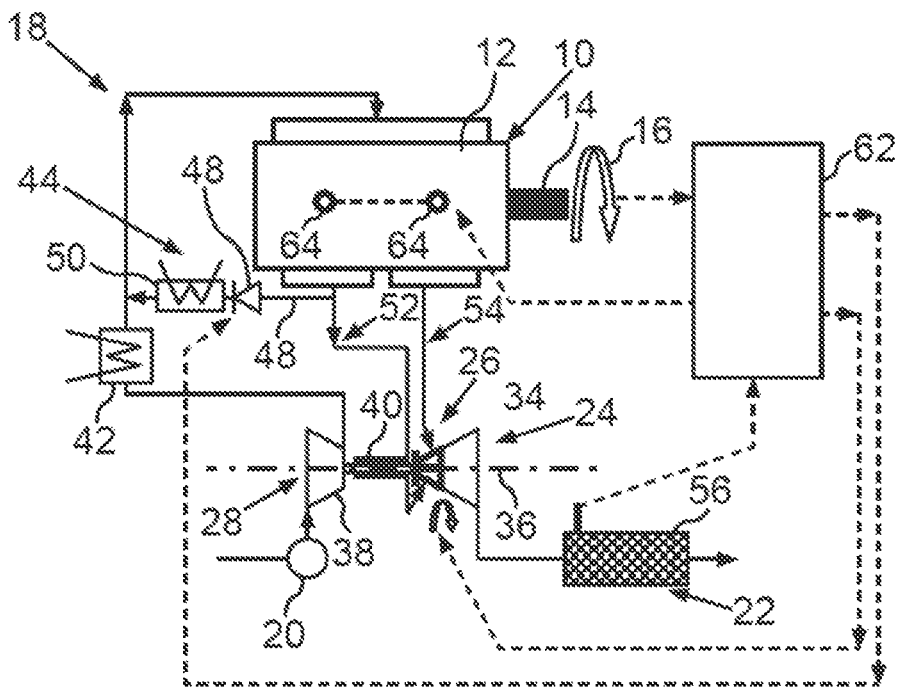
FIG. 1. is a schematic view of an internal combustion engine of a motor vehicle, comprising at least one turbine, which is a half-axial turbine and has a tongue slide.

FIG. 1 is a schematic view of an internal combustion engine, designated as a whole by 10, for a motor vehicle, in particular for a motor vehicle such as a passenger vehicle or a commercial vehicle. The motor vehicle can be driven by the internal combustion engine 10. The internal combustion engine 10 comprises at least one engine housing 12, designed for example as a cylindrical housing, by means of which at least one combustion chamber (not shown in FIG. 1) of the internal combustion engine 10 is formed. The combustion chamber is designed as a cylinder, for example, in which a piston is movably received, in particular translationally. The piston is for example hingedly connected to a drive shaft 14 of the internal combustion engine 10, the drive shaft 14 being rotatable relative to the engine housing 12, as shown by an arrow 16 in FIG. 1. The internal combustion engine 10 can provide torques for driving the motor vehicle by means of the drive shaft 14. In particular, the internal combustion engine 10 has a plurality of combustion chambers which are designed for example as cylinders.

The internal combustion engine 10 has an intake system 18 by means of which the air flowing through the intake system 18 is guided to and in particular into the cylinders. An air filter 20 is arranged in the intake system 18, by means of which the air flowing through the intake system 18 is filtered. The internal combustion engine 10 further comprises an exhaust gas system 22 through which exhaust gas from the internal combustion engine 10 can flow. The internal combustion engine 10 further comprises at least one exhaust gas turbocharger 24 which comprises a turbine 26 that is arranged in the exhaust gas system 22 and can be driven by the exhaust gas, and a compressor 28 that is arranged in the intake system 18 and can be driven by the turbine 26. The turbine 26 comprises—as can be seen in conjunction with FIG. 2—a turbine housing 30 by means of which a receiving region 32 is formed. The turbine 26 further comprises a turbine wheel 34 which is at least partly, in particular at least predominately or completely, received in the receiving region 32 and thus in the turbine housing 30 and is rotatable relative to the turbine housing 30 about an axis of rotation 36.

The compressor 28 has a compressor housing (not shown in the drawings) and a compressor wheel 38 which is arranged in the compressor housing and is rotatable relative to the compressor housing about an axis of rotation 36. The exhaust gas turbocharger 24 comprises a shaft 40 which is connected to the turbine wheel 34 and to the compressor wheel 38 for conjoint rotation. The turbine wheel 34 can be driven by the exhaust gas of the internal combustion engine 10 and is thus rotatable about the axis of rotation 36. By means of the shaft 40, the compressor wheel 38 can be driven by the turbine wheel 34. By driving the compressor wheel 38, at least some of the air flowing through the intake system 18 is compressed by means of the compressor wheel 38. The energy contained in the exhaust gas can therefore be used to compress the air.

A cooling apparatus 42 is also arranged downstream of the compressor 28 in the exhaust gas system 18, and is also referred to as an intercooler. The compressed and thus heated air is cooled by means of the intercooler. The internal combustion engine 10 further comprises an exhaust gas recirculation apparatus 44 which has at least one exhaust gas recirculation line 46. The exhaust gas recirculation line 46 is fluidically connected to the exhaust gas system 22 at a diversion point, such that at least some of the exhaust gas flowing through the exhaust gas system 22 can be diverted out of the exhaust gas system 22 at the diversion point. The diverted exhaust gas flows into the exhaust gas recirculation line 46 and is conveyed by means of the exhaust gas recirculation line 46 to an entry point, at which the exhaust gas recirculation line 46 is fluidically connected to the intake system 18. The diverted exhaust gas is recirculated to and in particular into the intake system 18 by means of the exhaust gas recirculation line 46 and can flow into the intake system 18 at the entry point. The exhaust gas flowing into the intake system 18 at the entry point is entrained by the air flowing through the intake system 18 and in particular is transported into the cylinders. The exhaust gas recirculation apparatus 44 comprises an exhaust gas recirculation valve 48 which is arranged in the exhaust gas recirculation line 46 and by means of which an amount of the exhaust gas to be recirculated flowing through the exhaust gas recirculation line 46 can be adjusted. The exhaust gas recirculation apparatus 44 further comprises an exhaust gas recirculation cooler 50 which is arranged in the exhaust gas recirculation line 46 and by means of which the exhaust gas flowing through the exhaust gas recirculation line 46 can be cooled.

The exhaust gas system 22 has a first flow path 52 through which a first part of the exhaust gas flows and a second flow path 54 through which a second part of the exhaust gas flows, the flow paths 52 and 54 being referred to for example as exhaust gas flow paths or manifold flow paths. The exhaust gas flowing through the flow path 52 comes for example from a first of the cylinders, the exhaust gas flowing through the flow path 54 coming for example from a second of the cylinders, which is different from the first cylinder. Therefore, for example a first group of the cylinders is combined with the flow path 52, a second group of the cylinders, which is different from the first group, being combined with the flow path 54.

As explained in more detail in the following, the turbine 26, in particular the turbine housing 30, has for example at least two channels through which the exhaust gas flowing through the flow paths 52 and 54 can flow and which are formed by the turbine housing 30, a first of the channels being for example fluidically connected to the flow path 52 and a second of the channels being fluidically connected to the flow path 54. As result, the exhaust gas flowing through the flow path 52 can flow out of the flow path 52 and into the first channel. Furthermore, the exhaust gas flowing through the flow path 40 can flow out of the flow path 54 and into the second channel. The exhaust gas which has flowed into the channels is guided by means of the channels to and in particular into the receiving region 32, and thus to the turbine wheel 34, such that the exhaust gas flowing through the channels can flow out of the channels and into the receiving region 32. As a result, the turbine wheel 34 is driven by the exhaust gas flowing out of the channels and into the receiving region 32.

FIG. 1 shows that the exhaust gas recirculation line 46 is fluidically connected to the flow path 52. The flow path 52 is therefore used for example to provide a sufficient amount of exhaust gas to be recirculated, and therefore the flow path 52 is also referred to as an EGR flow path. The flow path 54, or the exhaust gas flowing through the flow path 54, is for example at least substantially used to provide sufficient power for the turbine 26 in order to thus be able to compress the air to a sufficiently significant degree. As a result, the combustion-air ratio λ in the particular cylinder can be adjusted as needed, and therefore the flow path 54 is also referred to as a lamda flow path (λ flow path). In the flow path 52, the exhaust gas has for example a first pressure, it being possible for the exhaust gas in the flow path 54 to have a second pressure, for example. The exhaust gas is expanded by means of the turbine 26 such that the exhaust gas has a lower, third pressure upstream of the turbine 26 compared with the first pressure and the second pressure. An exhaust gas after-treatment apparatus 56 is arranged downstream of the turbine 26 in the exhaust gas system 22, by means of which apparatus the exhaust gas can undergo after-treatment.

The exhaust gas after-treatment apparatus 56 comprises a particle filter, for example, which is also referred to as a soot filter. Particles contained in the exhaust gas can be filtered out of the exhaust gas by means of the particle filter. Alternatively or in addition, the exhaust gas after-treatment apparatus 56 comprises denoxing means, i.e., means for denitrification of the exhaust gas. Denitrification of the exhaust gas is understood to mean that any nitrogen oxides contained in the exhaust gas (NOx) can be at least partly removed from the exhaust gas.

Figure 3:
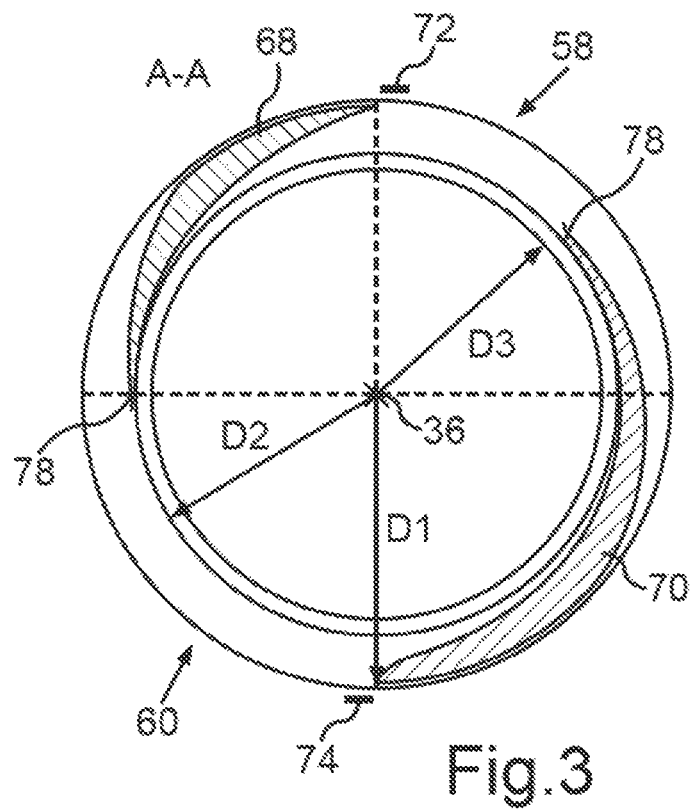
FIG. 3 is a schematic sectional view of the turbine according to FIG. 2 along a sectional line A-A shown in FIG. 2.

In conjunction with FIG. 3, it can be seen that the turbine 26 is a segment turbine or a multi-segment turbine and comprises the at least two channels, in the form of segments 58 and 60, which are formed by the turbine housing 30, which are at least partly separated from one another, through which the exhaust gas of the internal combustion engine 10 can flow, and which lead into the receiving region 32 successively in the circumferential direction of the turbine wheel 34, by means of which segments the exhaust gas flowing through the segments 58 and 60 can be or—during an operation of the internal combustion engine 10—is guided into the receiving region 32 and thus to the turbine wheel 34. The segment 58 is therefore for example the above-mentioned first channel and is fluidically connected to the flow path 52 such that the exhaust gas flowing through the flow path 52 can flow out of the flow path 52 and into the segment 58. The segment 60 is for example the above-mentioned second channel and is therefore fluidically connected to the flow path 54 such that the exhaust gas flowing through the flow path 54 can flow out of the flow path 54 and into the segment 60.

The segments 58 and 60 extend for example in the circumferential direction of the turbine wheel 34 over the circumference thereof substantially in the shape of a spiral, and therefore the segments 58 and 60 are spiral channels. The spiral channels are referred to as segment spirals, spiral segments or turbine spirals, however.

Figure 2:
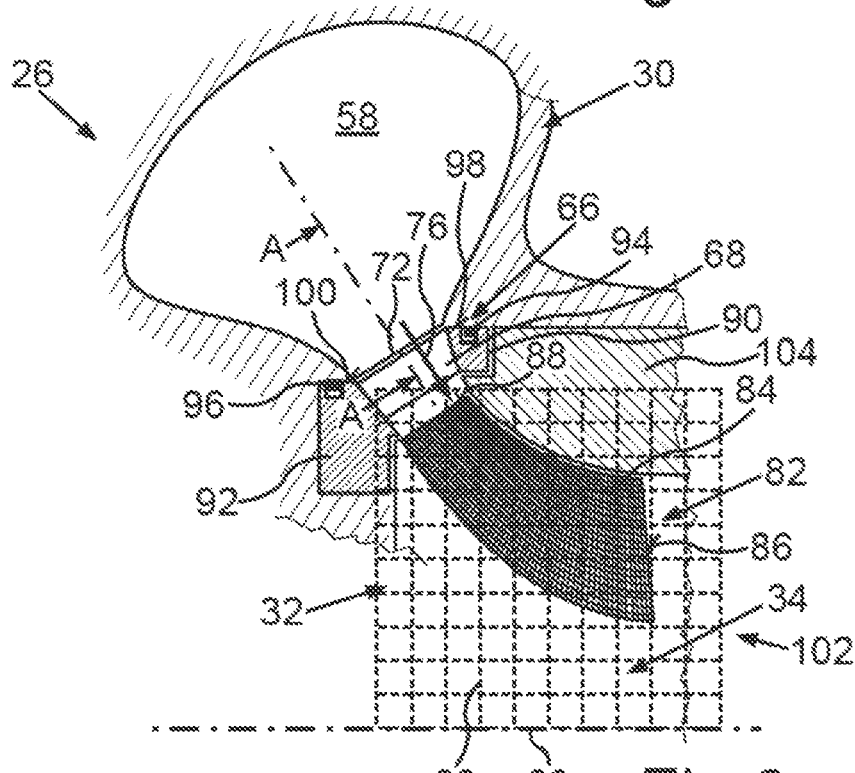
FIG. 2 shows a detail of a schematic longitudinal sectional view of the turbine according to a first embodiment.

FIG. 2 shows a detail of the turbine 26 in a schematic longitudinal sectional view; the segment 58 can be seen in FIG. 2 as being representative of the segments 58 and 60. It is in particular conceivable for the segments 58 and 60 to be asymmetric to one another, in particular with respect to their respective cross sections through which the exhaust gas flows.

The internal combustion engine 10 further comprises an electronic computing apparatus 62, which is also referred to as a control unit. For example, the load provided by the internal combustion engine 10 and/or the rotational speed of the internal combustion engine 10, in particular of the drive shaft 14, is detected and supplied to the control unit such that the control unit receives the load and/or the rotational speed and can operate the internal combustion engine 10 on the basis of the detected load and/or on the basis of the detected rotational speed. In particular, the exhaust gas after-treatment apparatus 56 is operated, in particular controlled in an open- or closed-loop, by the control unit on the basis of the detected load and/or on the basis of the detected rotational speed. Furthermore, for example the exhaust gas recirculation valve 48 is operated by the control unit, in particular on the basis of the detected load and/or on the basis of the detected rotational speed, such that the amount of the exhaust gas to be recirculated can be adjusted by the control unit, for example. Furthermore, a constant throttle 64 is associated with the relevant cylinder, it being possible for the relevant constant throttle 64 to be operated by the control unit in particular on the basis of the detected load and/or on the basis of the detected rotational speed. The relevant constant throttle 64 is also referred to as a constant throttle valve.

When considering FIGS. 2 and 3 together, it is particularly clear that the turbine 26 has a variability, designed as a tongue slide 66, which is arranged at least in part upstream of the turbine wheel 34 in the flow direction of the exhaust gas through the turbine 26, and is therefore also referred to as an inlet variability. The tongue slide 66 comprises a tongue 68 and 70 for each segment 58 and 60, which tongue can be seen particularly clearly in FIG. 3, the tongue 68 being associated with the segment 58 and the tongue 70 being associated with the segment 60, for example. The tongues 68 and 70 are slidable or rotatable, in particular jointly or simultaneously, relative to the turbine housing 30 about the axis of rotation 36. By means of the relevant tongue 68 or 70, a relevant flow cross section of the associated segment 58 or 60 can be adjusted. The exhaust gas flows out of the relevant segment 58 or 60 and into the receiving region 32 via this relevant flow cross section. In other words, the exhaust gas flowing through the relevant segment 58 or 60 can be conveyed into the receiving region 32 via the relevant flow cross section and supplied to the turbine wheel 34. Expressed in other words again, the relevant exhaust gas flowing through the relevant segment 58 or 60 and provided by the internal combustion engine 10 flows out of the relevant segment 58 or 60 via the relevant flow cross section into the receiving region 32. In this case, the relevant flow cross section is arranged upstream of the turbine wheel 34 with respect to the flow direction of the exhaust gas through the turbine 26, such that the tongue slide 66 functions or is designed as an inlet variability.

The tongues 68 and 70 are for example slidable relative to the housing 30 between a closed position and at least one open position. In the closed position, at least one relevant sub-region of the relevant flow cross section is blocked by the relevant tongue 68 or 70, such that exhaust gas cannot flow through the blocked sub-region. In the relevant open position, the relevant tongue 68 or 70 leaves the relevant sub-region clear, such that the exhaust gas can flow through the relevant sub-region that has been left clear. This means that a first value for the relevant flow cross section is set in the closed position. In the relevant open position, a second value for the relevant flow cross section is set, the second value being greater than the first value. This means that the relevant tongue 68 or 70 leaves the associated flow cross section open to a greater extent in the open position than in the closed position. As a result, the turbine 26 can be advantageously adapted to different operating points of the internal combustion engine 10, and in particular to different exhaust-gas mass flows. Respective walls 72 and 74 of the turbine housing 30 are arranged between the segments 58 and 60 in the circumferential direction of the turbine wheel 34, the segments 58 and 60 being separated from one another by means of the walls 72 and 74. The walls 72 and 74 are also referred to as housing walls or housing tongues, the respective ends of the housing tongues and for example the respective closed positions of the tongues 68 and 70 being shown in FIG. 3. It can also be seen that the respective tongues 68 and 70 extend from an outer diameter D1 to an inner diameter D2, or vice versa. In addition, the outer diameter of the turbine wheel 34 is designated by D3 in FIG. 3.

In order now to be able to realize a particularly effective operation—as is particularly clear from FIG. 2—the turbine 26 is a half-axial turbine in which a relevant flow direction, which is illustrated in FIG. 2 by an arrow 76 and in which the exhaust gas flows from the relevant segment 58 or 60 through the relevant flow portion into the receiving region 32 and to the turbine wheel 34 during the operation of the turbine 26, extends obliquely to axial and obliquely to the radial direction of the turbine wheel 34. The flow direction of the exhaust gas extends obliquely to the axial direction and obliquely to the radial direction of the turbine wheel 34 in a plane spanned by the axial direction and by the radial direction of the turbine wheel 34. Overall, the turbine 26 is a half-axial, tongue-slide segment turbine, by means of which a particularly efficient and thus fuel-efficient operation of the internal combustion engine 10 can be shown.

In FIG. 2, it is clear from the example of the tongue 68 that the respective tongues 68 and 70 have at least one trailing edge 78 by means of which the exhaust gas flows off the relevant tongue 68 or 70 toward the receiving region 32 when the turbine 26 is operated. The relevant trailing edge 78 extends at least in part along a theoretical surface that extends conically in the axial direction of the turbine wheel 34. The housing tongues also lie on such a theoretical surface which extends conically in the axial direction of the turbine wheel 34.

It can be seen from FIG. 2 that the turbine wheel 34 comprises a hub 80, and blades 82 which are connected to the hub 80 and are for example integral with the hub 80, it being possible to discern a rotor blade which is designated by 84 from the rotor blades in FIG. 2. Since the rotor blade 84 is a rotor blade of the turbine wheel 34, the rotor blade 84 is also referred to as a turbine blade. The rotor blade 84 has a trailing edge 86 by means of which the exhaust gas flows off the rotor blade 84 during the operation of the turbine 26. The rotor blade 84 also has a leading edge 88, which is also referred to as an onflow edge. By means of the leading edge 88, the exhaust gas flows against the rotor blade 84 during the operation of the turbine 26. The relevant leading edge 88 extends at least in part along a theoretical surface that extends conically in the axial direction of the turbine wheel 34.

In contrast with a simple radial turbine, which is also referred to as a radial turbine, in the case of the half-axial turbine the exhaust gas is not supplied to the turbine wheel 34 in a strictly axial or a strictly radial manner, but rather the exhaust gas is supplied to the turbine wheel 34 obliquely to the axial direction and obliquely to the radial direction of the turbine wheel 34.

The tongue slide 66, of which the trailing edges 78 extend at least predominately along a conical surface at least substantially in parallel with the leading edge 88, has for example two integrated cover rings 90 and 92, which are provided as cylindrical running surfaces comprising sealing elements 94 and 96, for example. The respective tongues 68 and 70 are arranged in the axial direction of the turbine wheel 34 between the cover rings 90 and 92 and are connected to the cover rings 90 and 92. It is in particular conceivable for the tongues 68 and 70 to be integral with the cover rings 90 and 92. The tongues 68 and 70 are rotatably mounted on the turbine housing 30, for example by means of the cover rings 90 and 92. The cover rings 90 and 92 have for example at least substantially cylindrical respective lateral surfaces 98 and 100 on the outer circumference, by means of which surfaces the cover rings 90 and 92 can be or are supported on the turbine housing 30 outwardly in the radial direction. In this case, for example the lateral surfaces 98 and 100 on the outer circumference act as the abovementioned running surfaces on which the sealing elements 94 and 96 are provided. In particular, the lateral surfaces 98 and 100 have respective grooves in which the sealing elements 94 and 96 are received, for example. By means of the sealing elements 94 and 96, the cover rings 90 and 92 are sealed off from the turbine housing 30 such that undesired flows, such as leakage flows, can be prevented. The cover rings 90 and 92, together with the tongues 68 and 70, are rotatable or slidable relative to the turbine housing 30 about the axis of rotation. In the finished state of the exhaust gas turbocharger 24, the turbine housing 30 is for example connected to a bearing housing (not shown in the drawings). The leading edge 88 is arranged in an inlet region, by means of which the exhaust gas flows against the rotor blade 84. The trailing edge 86 is for example arranged in an outlet region 102 into which the exhaust gas flowing off the rotor blade 84 via the trailing edge 86 flows. In this case, the bearing housing is arranged on a side facing away from the outlet region 102. The cover ring 92 is arranged closer to the bearing housing than the cover ring 90, and therefore the cover ring 92 is a bearing-side element. The bearing-side cover element of the tongues 68 and 70 is used, for example, to couple the tongues 68 and 70 to an actuator (not shown in the drawings). In other words, the tongues 68 and 70 are coupled to an actuator by means of the cover ring 92, for example, by means of which actuator the tongues 68 and 70 can be slid about the axis of rotation 36 in particular by means of the cover ring 92. The actuator is therefore used to cause the rotational movement of the tongues 68 and 70 and acts as an adjustment apparatus, which is arranged at least partly in the bearing housing, for example.

For example, the cover ring 92, which is also referred to as a cover disc ring, has teeth which engage in a separately mounted, rotatable gear segment. The gear segment is for example rigidly connected to a lever of an adjustment apparatus, which lever can be pivoted for example by means of the actuator outside of the turbine and carries out pivot movements as a result of being pivoted. By means of the lever, the pivot movements are converted for example into rotational movements of the tongues 68 and 70, such that the rotational movements of the tongues 68 and 70 can be set in a defined and controlled manner. The cover ring 90 is oriented toward a wheel outer contour of the turbine wheel 34, for example, and is also used for bearing, preferably also in the turbine housing 32. The sealing elements 94 and 96 are used in particular to minimize leakage gas flows over the respective circumferences of the respective cover rings 90 and 92.

The turbine 26 also has at least one contour piece 104 that is separate from the turbine housing 30, separate from the tongue slide 66 and separate from the turbine wheel 34, and is held on the turbine housing 30, and by means of which at least part of the turbine wheel 34 is covered outwardly in the radial direction, and in the axial direction. The contour piece 104 is also referred to as an outer contour piece, which can be or is mounted on the turbine housing 30. By means of the contour piece 104, an axial tolerance of the tongue slide 66 is created for ensuring the rotational functionality of the tongue slide 66 in the case of high component temperatures in the overall engine map and in non-stationary phases of the internal combustion engine 10. Furthermore, the mountable contour piece 104, designed as a contour component, provides a simple solution for solving an undercut problem between the tongue slide 66 and the turbine wheel 34, designed as a half-axial turbine wheel, as a result of a mounting sequence to be explained in the following. As part of the manufacture of the turbine 26, for example the following mounting sequence takes place in order to ensure simple and cost-effective manufacture of the turbine 26: First, the turbine housing 30 is connected to the bearing housing, for example. The tongue slide 66 is then mounted on the turbine housing 30. The turbine wheel 34 is then mounted. Subsequently, the contour piece 104 is mounted by for example being inserted in the axial direction into the turbine housing 30.

FIG. 2 shows that the cover ring 90 is at least partly covered by the contour piece 104 inwardly in the radial direction of the turbine wheel 34. In this case, for example the tongue slide 66 is rotatably mounted on the contour piece 104 by means of the cover ring 90. Irrespective of the tongue slide 66 acting as a variability, it is conceivable for the half-axial turbine to be fitted with a dual-flow, asymmetric turbine housing and, in this way, to be designed for example as a fixed geometry turbine without a variability.

The tongue slide 66 is a rotary slide, which represents a simple and thus cost-effective and robust variability. For example, the above-mentioned adjustment apparatus is provided for rotating the tongue slide 66 and is arranged at least partly, in particular predominately or completely, in the bearing housing. Furthermore, a bearing for the tongue slide 66 is provided by means of the cover rings 90 and 92. In addition, sealing is provided by means of the sealing elements 94 and 96 so that leakages and axial thrusts can be kept particularly low. Furthermore, particularly simple mounting can be realized, despite the variability, by means of the geometric ratios of the wire inlet and the conical tongue bearing of the tongue slide 66, such that an undercut problem can be solved or avoided.

Figure 4:
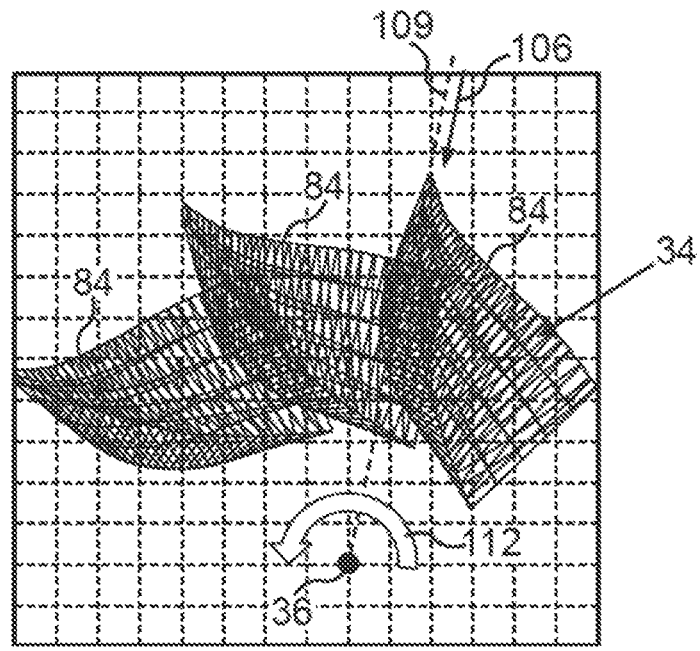
FIG. 4 shows a detail of a wire frame model of a first embodiment of a turbine wheel of the turbine.
Figure 5:
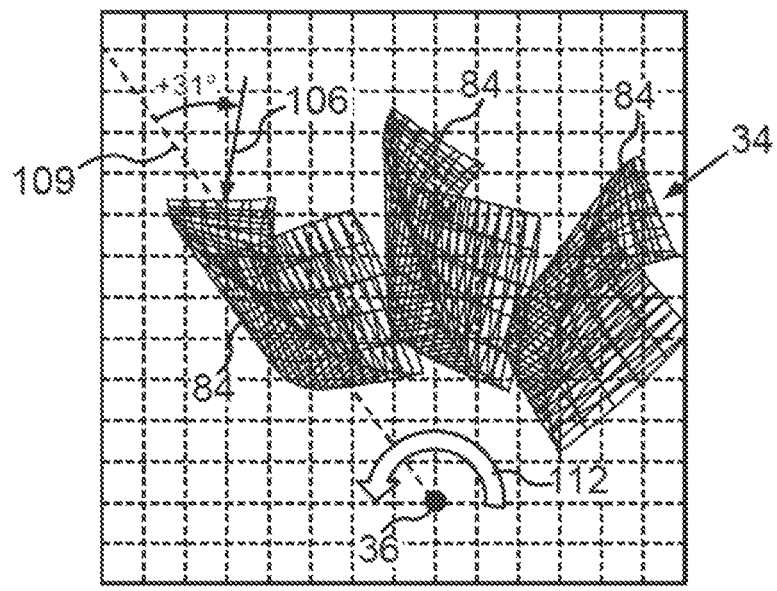
FIG. 5 shows a detail of a wire frame model of a second embodiment of the turbine wheel.

FIGS. 4 and 5 show details of respective wire frame models or wire frame representations of various embodiments of the turbine wheel 34. According to FIG. 4, the turbine wheel 34 is a half-axial wheel and thus a ten-blade device, meaning that the turbine wheel 34 according to FIG. 4 comprises exactly ten rotor blades 84. The turbine wheel 34 according to FIG. 4 has a blade inlet angle $\beta_{1s}$ of at least substantially 90 degrees, which is illustrated in FIG. 4 by an arrow 106. Furthermore, the radial direction of the turbine wheel 34 is illustrated in FIG. 4 by a dashed line 109. In addition, an arrow 112 in FIG. 4 illustrates the direction of rotation in which the turbine wheel 34 rotates during operation of the turbine. In the turbine wheel 34 according to FIG. 4, a tip-speed ratio $U/C_{0,opt}$ of 0.7 is provided. In particular, FIGS. 4 and 5 are wire frame representations of the turbine wheel 34, showing the turbine wheel outlet along the axis of rotation 36. A particularly high degree of robustness can be realized by a blade inlet angle $\beta_{1s}$ of approximately 90 degrees.

In the embodiment shown in FIG. 5, the turbine wheel 34 has a blade inlet angle $\beta_{1s}$ of 121°, which is illustrated in FIG. 5 by the arrow 106 and the dashed line 109. For example, the arrow 106 illustrates the flow direction in which the exhaust gas flows against the particular leading edge 88. In particular, the blades 82 of the turbine wheel 34 are strictly radial, and therefore extend strictly in the radial direction. According to the view shown in FIGS. 4 and 5, the flow direction extends for example at least substantially in parallel with the radial direction, and thus the blade inlet angle $\beta_{1s}$ is 90 degrees. In the embodiment shown in FIG. 5, the flow direction includes an angle of 31 degrees with the radial direction, resulting in a blade inlet angle $\beta_{1s}$ of 121 degrees (90 degrees+31 degrees). The turbine wheel 34 according to FIG. 5 has for example a tip-speed ratio $U/C_{0opt}$ of ≥0.6.

Figure 6:
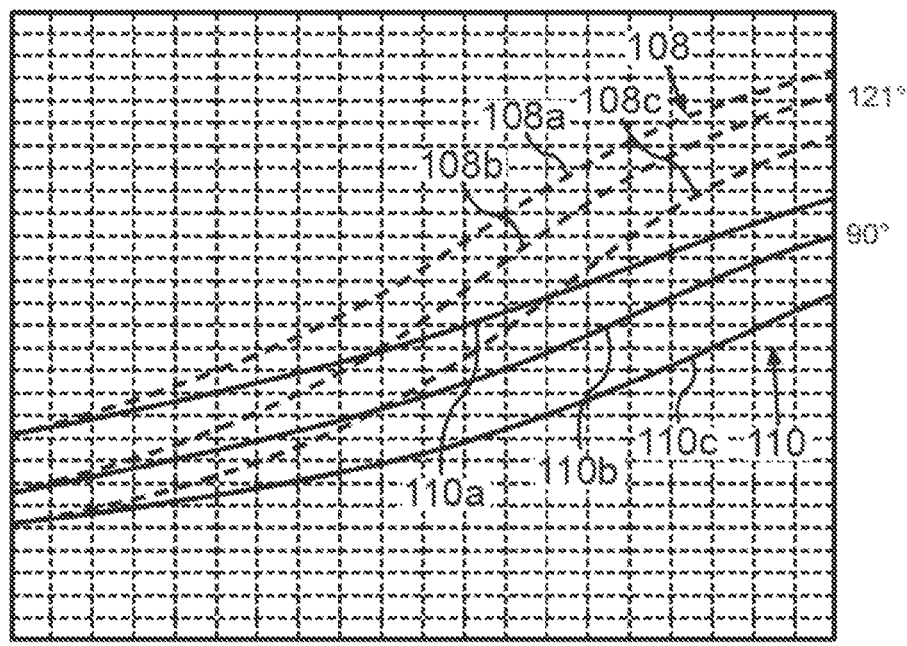
FIG. 6 is a diagram for illustrating a blade angle progression of the embodiment of the turbine wheel.

In FIG. 6, dashed curves 108 illustrate respective blade angle progressions with respect to the circumferential direction along the hub 80, the surface center and the outer contour of the turbine wheel 34 according to FIG. 5, solid curves 110 illustrating the respective blade angle progressions with respect to the circumferential direction along the hub 80, the surface center and the outer contour of the turbine wheel 34 according to FIG. 4. Here, curves 108a and 110a illustrate the blade angle progression along the wheel 80, curves 108b and 110b illustrate the blade angle progression along the center, and curves 108c and 110c illustrate the blade angle progression along the outer contour and thus outside.

The turbine wheel 34 according to FIG. 4 has a blade inlet angle $\beta_{1s}$ of 90 degrees and thus has the same blade inlet angle as a radial turbine. According to FIG. 6, the turbine wheel 34 according to FIG. 5 has for example a tip-speed ratio $U/C_{0opt}$ of <0.62. With respect to the center, the angle $\beta_{2n}$ is for example 33 degrees. FIG. 6 therefore shows the very soft angle progression of the turbine wheels 34, designed as half-axial turbine wheels. On the basis of the very soft angle progression of the half-axial turbine wheels, the dominant advantage in the channel progression of the half-axial turbine wheels over the known progressions of radial turbines becomes obvious, for which reason advantages in respect of the degree of effectiveness of the half-axial turbines compared with radial turbines ought to be developable on this principle alone. The degree of freedom of the blade inlet angle $P_{1s}$ in the case of strictly radial blades, as a result of which bending moments can be avoided, can be seen particularly well in FIGS. 5 and 6.

The respective segments 58 and 60, which can be seen in FIGS. 2 and 3, are mono-spirals which are positioned upstream of the turbine wheel 34. The turbine housing 30 is a mono-spiral housing, for example. The relevant exhaust gas flowing through the relevant segment 58 or 60 is supplied to the receiving region 32 via a relevant nozzle, for example, with swirl generation taking place in the respective spirals positioned upstream of the respective nozzles, in particular if it is a multi-segment spiral housing rather than a mono-spiral housing. The surface tapping of the inlet spiral cross section is achieved by means of the movable tongue slide 66, as a result of which the swirl generation and the power of the turbine 26 can be varied as desired by means of the influenced turbine throughput capacity and build-up behavior. The tongue slide 66 is therefore located beneath the stationary, obliquely extending housing tongue.

The adjustment apparatus is arranged for example on the bearing side also because of the cooling potential of oil or water, the tongue slide 66 being in particular controllably movable by means of the actuator over the cover ring 92 in order to tap the corresponding flow cross sections or spiral surfaces.

After the tongue slide 66 has been mounted in the turbine housing 30 from the turbine outlet side, the turbine rotor is installed by means of the radial and axial bearing elements and is secured by means of the compressor side. Subsequently, the outer counter piece (contour piece 104) is inserted above the wheel outer contour and is for example fastened in a defined axial position in a turbine outlet flange region, as a result of which the axial tolerance of the rotatable tongue slide 66 over the distance from the contour piece 104 the full variable functionality of the turbine 26 is set for the tongue slide 66 in all expected operating phases. An undercut problem between the turbine wheel 34 and the tongue slide 66 can thus be avoided.

Figure 7:
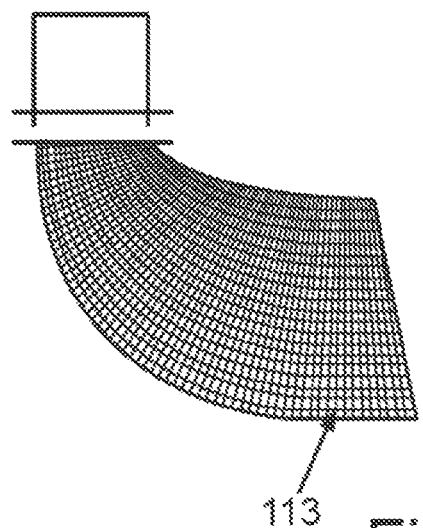
FIG. 7 shows a detail of a schematic and sectioned side view of a radial turbine.

FIG. 7 shows a detail, in a schematic and sectioned side view, of a conventional radial turbine, in which the exhaust gas is supplied to the radial turbine, designated by 113 in FIG. 7, in a strictly radial manner during an operation of the radial turbine.

Figure 8:
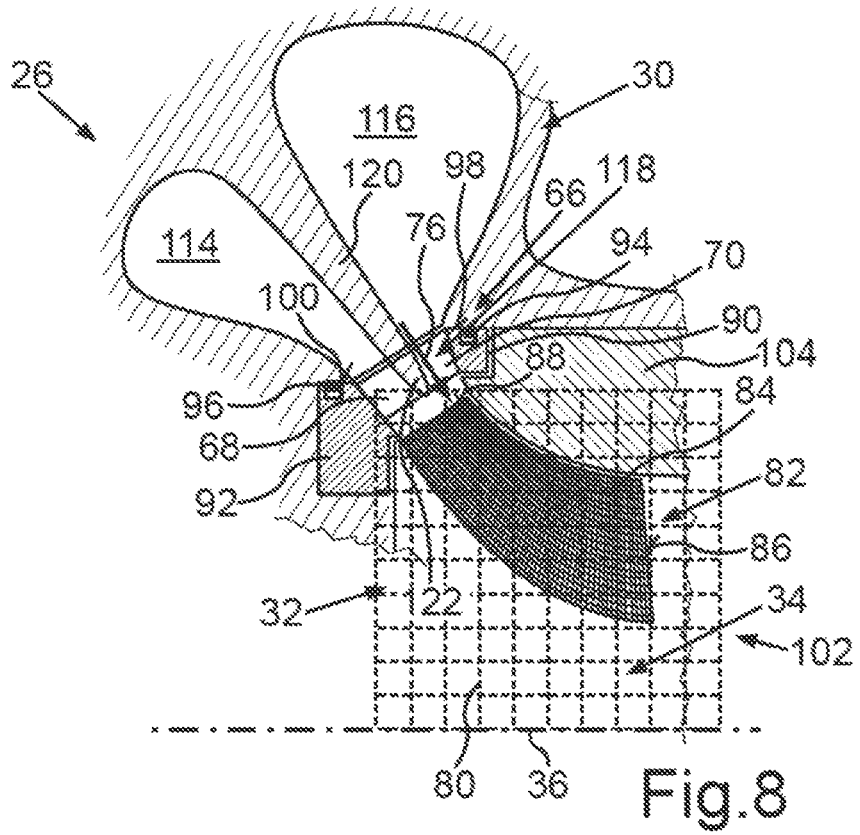
FIG. 8 shows a detail of a schematic longitudinal sectional view of the turbine according to a second embodiment.

FIG. 8 is a schematic longitudinal sectional view of a second embodiment of the turbine 26, the turbine 26 according to the second embodiment being a twin-flow turbine. In the second embodiment shown in FIG. 8, the turbine 26 has at least two channels which are formed by the turbine housing 30 and are in the form of flow paths 114 and 116, which are also referred to as turbine flow paths and do not lead into the receiving region 32 successively or consecutively for instance in the circumferential direction of the turbine wheel 34, but do so successively or consecutively in the axial direction of the turbine wheel. In particular, the flow paths 114 and 116 lead into the receiving region 32 via a common nozzle 118, such that the exhaust gas flowing through the flow paths 114 and 116 flows out of the flow paths 114 and 116 into the nozzle 118 and flows via the nozzle 118 into the receiving region 32.

Figure 9:
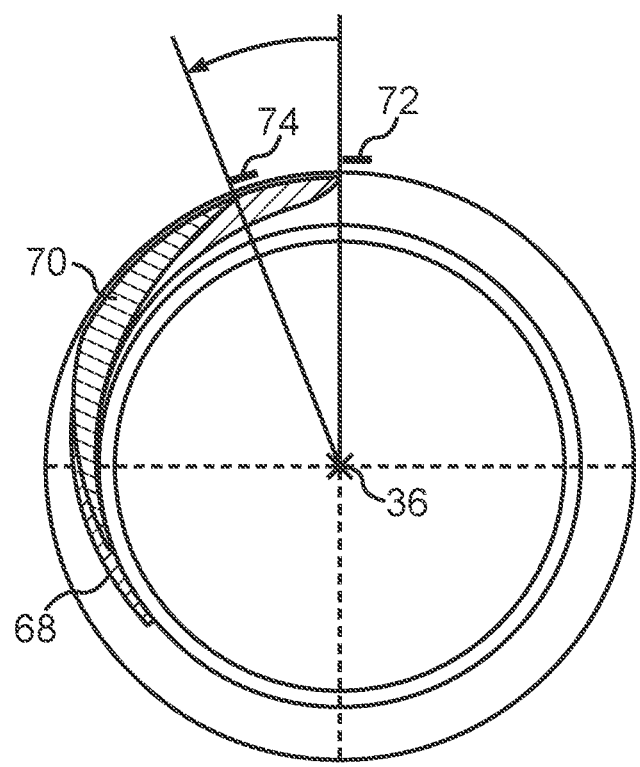
FIG. 9 shows a detail of a schematic cross-sectional view of the turbine according to the second embodiment.

The flow paths 114 and 116 are separated by a dividing wall 120 of the turbine hosing 30, which wall is arranged between the flow paths 114 and 116. FIG. 9 shows an offset which extends in the circumferential direction between the housing tongues and between the tongues 68 and 70. As with the segment 58, the flow path 114 is used for example as an EGR segment or EGR flow path, from which the exhaust gas to be recirculated is diverted. As with the segment 60, the flow path 116 is used for example as a lamda flow path or lamda segment in order to adjust the combustion-air ratio. The tongue 68 is for example associated with the flow path 114, and the tongue 70 is associated with the flow path 116, it being possible for the tongues 68 and 70 to be integral or to be separate from one another. It is conceivable for the tongues 68 and 70 to be able to slide jointly or simultaneously, or to slide relative to one another or independently of one another, relative to the turbine housing 30 about the axis of rotation 36. For example, symmetric or asymmetric spiral surfaces of the housing flow path are shown with the tongue slide 66, it being possible for the tongues 68 and 70 to have different lengths, in particular in the circumferential direction of the turbine wheel 34. Alternatively or in addition, the tongues 68 and 70 may have an offset with respect to the housing tongues (walls 72 and 74). It can be seen from FIG. 8 that a wall element 122 is arranged between the tongues 68 and 70, by means of which element the dividing wall 120 is continued, the wall element 122 being movable or slidable together with the tongue 68 or 70.

For a rapid response of the exhaust gas after-treatment apparatus 56, the control of the turbine 26, designed as an adjustable turbine, by means of the exhaust gas recirculation valve 48 and the relevant constant throttle valve can be carried out very effectively as part of a thermal management process. Furthermore, an advantageous engine braking system can be realized on account of the robust and variable tongue slide 66, in particular when the small constant throttle valves are used in the cylinders and are open in engine braking phases.

The invention claimed is:
1. A turbine for an exhaust gas turbocharger of an internal combustion engine, comprising:
a turbine housing having a receiving region;
a turbine wheel which is disposed at least partly in the receiving region and is rotatable relative to the turbine housing about an axis of rotation;

a channel formed by the turbine housing through which exhaust gas from the internal combustion engine is flowable and which leads into the receiving region in order to guide exhaust gas flowing through the channel into the receiving region and to the turbine wheel; and a tongue slide which has a tongue that is associated with the channel and that is slidable relative to the turbine housing about the axis of rotation, wherein via the tongue a flow cross section of the channel is adjustable, wherein exhaust gas flowing through the channel is conveyable into the receiving region and to the turbine wheel via the flow cross section;

wherein the turbine is a half-axial turbine in which a relevant flow direction, in which the exhaust gas flows from the channel through the flow cross section into the receiving region and to the turbine wheel during an operation of the turbine, extends obliquely to an axial direction, and obliquely to a radial direction, of the turbine wheel;

wherein the tongue has a trailing edge via which the exhaust gas flows off the tongue towards the receiving region when the turbine is operated, wherein the trailing edge extends at least in part along a theoretical surface that extends conically in the axial direction of the turbine wheel;

wherein the turbine wheel has rotor blades having respective leading edges via which the exhaust gas flows against the turbine wheel when the turbine is operated, wherein the respective leading edges extend at least in part along the theoretical surface that extends conically in the axial direction of the turbine wheel;

wherein the tongue is disposed in the axial direction of the turbine between cover rings of the tongue slide, wherein the tongue is connected to the cover rings which are rotatable relative to the turbine housing about the axis of rotation, and wherein the tongue is rotatably mounted on the turbine housing via the cover rings.

2. The turbine according to claim 1, wherein at least one of the cover rings is sealed off from the turbine housing by a sealing element.

3. The turbine according to claim 1, wherein the tongue is coupled to an actuator by one of the cover rings, wherein via the actuator the tongue is rotatable relative to the turbine housing about the axis of rotation.

4. The turbine according to claim 1 further comprising a contour piece that is separate from the turbine housing and separate from the tongue slide, wherein the contour piece is held on the turbine housing and wherein via the contour piece at least part of the turbine wheel is covered outwardly in the radial direction and in the axial direction.

5. The turbine according to claim 4, wherein one of the cover rings is at least partly covered by the contour piece inwardly in the radial direction of the turbine wheel.

6. The turbine according to claim 4, wherein the tongue slide is rotatably mounted on the contour piece via one of the cover rings.

* * * * *